United States Patent [19]
Rongved

[11] Patent Number: 5,628,260
[45] Date of Patent: May 13, 1997

[54] VERTICAL RING PROCESSOR

[76] Inventor: Paul I. Rongved, 5701 Blvd. East Apt. 12H, West New York, N.J. 07093

[21] Appl. No.: 391,199

[22] Filed: Feb. 21, 1995

[51] Int. Cl.$^6$ ................................. F23G 5/00; F23G 7/00
[52] U.S. Cl. ........................ 110/245; 422/140; 122/4 D; 110/258
[58] Field of Search ................................. 110/229, 224, 110/227, 245, 258; 122/4 D; 34/363, 368; 422/140, 146, 147

[56] References Cited

U.S. PATENT DOCUMENTS 4,249,472   2/1981   Mitchell ................................. 110/245

*Primary Examiner*—Henry A. Bennett
*Assistant Examiner*—Susanne C. Tinker

[57] ABSTRACT

This invention related to a processing device such as a calciner or the like. The processing vessel is vertical with concentric cylindrical inner and outer walls, closely spaced and heated for rapid thermal processing, with strong boiling, evaporating, fluidizing and gasifying feed. This vigorous action is helping the steady gravitational movement of feed through the vessel. A top inlet for feed and a bottom outlet for residue are provided. Means for preventing air infiltration and means for controlling flow and keeping vessel filled during processing are provided. Any number of outlets for steam, boiling hot water, fluidized and gasified material at various heights of the vessel. Some material require addition of catalysts to bring about a chemical change and reduction in a pyrolitic process.

7 Claims, 2 Drawing Sheets

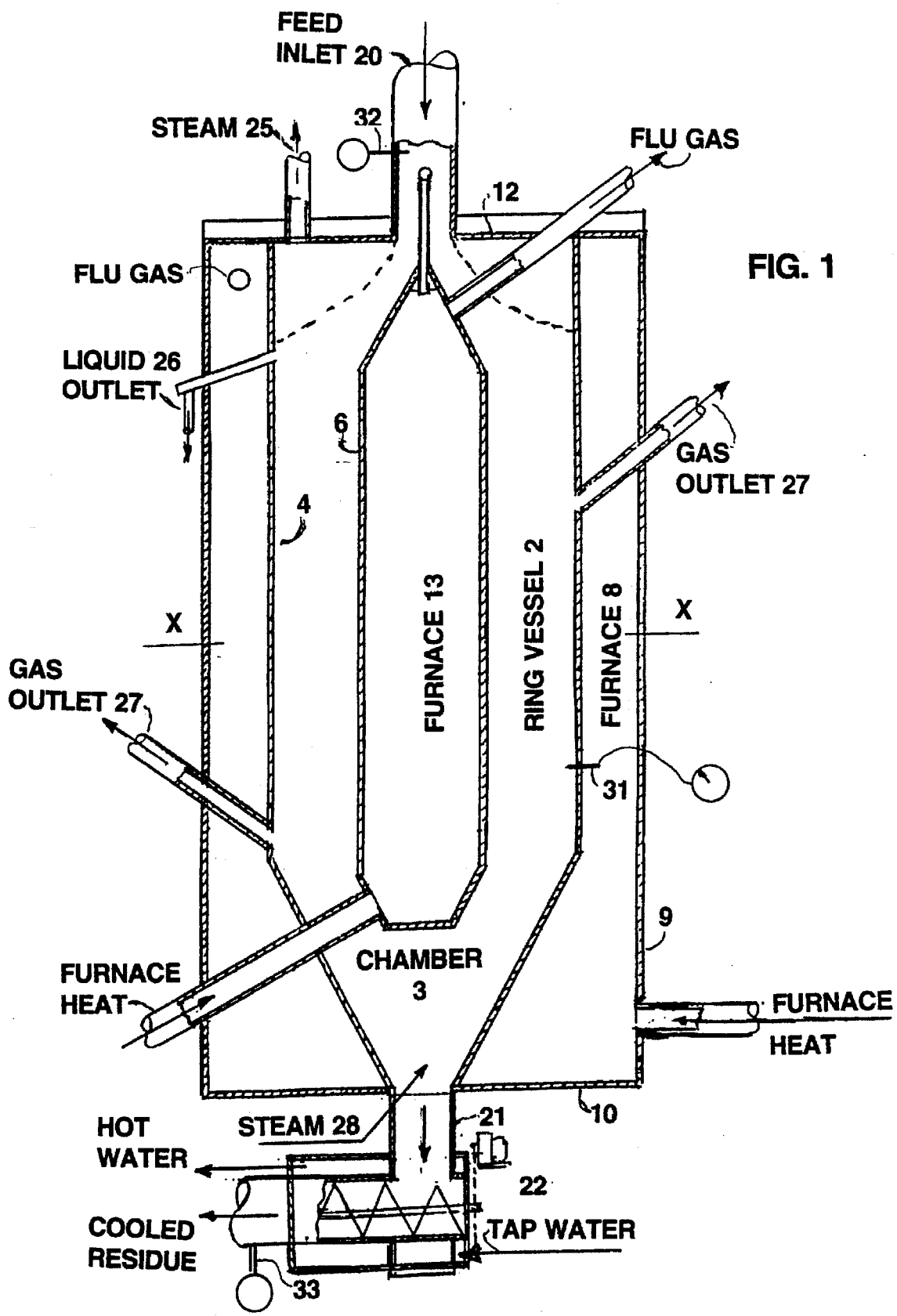

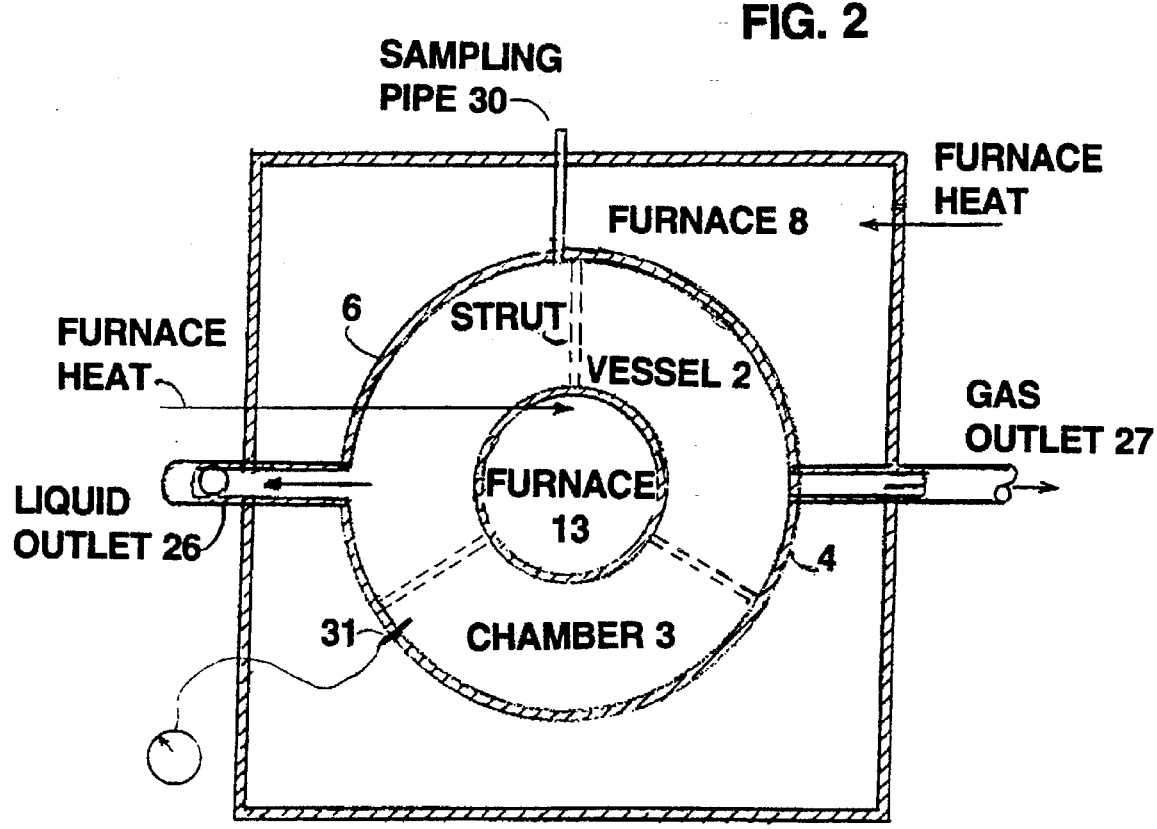

VERTICAL RING PROCESSOR

PRIOR ART

Calciners, dryers, roasters and other types of thermal processing devices have been used for many year and for many purposes. For example chafing organic material, including wood chips and coconut shells to charcoal or pyrolysing shredded discarded tires to produce isoprene and fuel gases, or gasifying organic waste material to produce fuel gases. Known devices include rotating or stationary kilns, rotating hearths, multiple hearths and fluidized beds. They all need mechanical devices and devices to move feed material being processed. They have varying degree of, or lack of control of movement, temperatures and moisture in feed during processing, some have dust problem. They are all expensive to build, maintain and operate. This type of calciners are not widely used in potentially large markets.

SUMMARY OF THE INVENTION

In accordance with the present invention there is provided an improved thermal treatment device, calciner or the like (herein after and in the following claims referred to as "vessel" comprised of substantially vertical, and concentric cylindrical ring walls, closely, placed, providing a tall narrow ring shaped chamber or housing through which the material being threaded is moving by the force of gravity. In an alternative embodiment of the invention said walls may be tilted, bent or curved from the vertical plane, but not so much that this could be hindering gravity flow of material being threaded. Further, the vessel is provided with feed material inlet means located at the top, and residue outlet means located at the bottom end. Means of preventing air infiltration is provided at inlet and outlet means.

Bottom outlet means is provided with means of controlling flow of feed material and keeping chamber filled during processing and means of cooling residue with heat recovery means before discharging. The weight and gravity force is moving the material to be processed in through top inlet and through the chamber along its substantially vertical axis from top to bottom and is moving processed residue out through bottom outlet. A gas, oil, steam or electrical source for heating the outer and inner ring walls, heats the material during processing. Temperature must be high, creating an expanding, strong boiling, liquifying or gasifying of the material at the wall heating surfaces. This intense action is forcing boiling and gasified material along the walls upwards as gravity is forcing material in the inside area of the narrow ring shaped chamber downwards and sideways hard against the walls, in a downward spiraling and mixing movement of feed material. The weight of feed material above is increasing the gravity force and the downward and sideways pressure, speeding tip boiling, liquification and gasification along the walls, preventing wall friction and reducing feed volume and assuring steady downward spiraling and mixing movement feed through the narrow ring shaped vessel. Further outlet means for separate removal of boiling hot water and steam near the top of the vessel is provided. Outlet means for separate removal of liquified and gasified material is provided at various heights of the vessel. At the upper part such material comes from feed with short process time, in middle it comes from feed with medium process time and at the lower part of the vessel such material comes from feed with the longest process time. The removed material has different consistencies and often great difference in value. The smaller the width of the ring of the vessel the larger the ratio of wall heating surface to volume of feed will be, and the closer the feed is to these heating surfaces the faster and more efficient the processing will be. However there is a practical problem with handling the bulkiness of feed therefore the ring width of the vessel is usually about 12 inches, but not more than about 18 inches, even for large diameter and tall vessel. A 12 to 14 feet diameter and a 30 to 40 feet tall vessel is reasonable for large projects, processing hundreds of tons of feed material per day. For the other extreme on very small projects the ring vessel may be reduced in an alternative embodiment of the invention to a circular tube about 12 inches, but not more than 18 inch in diameter and up to about 25 ft tall with the corresponding attributes as described for the ring vessel. In an alternative embodiment of the invention the circular shape of the cylindric ring walls of the vessel or tube can be elliptical, rectangular or polygonal as viewed in cross section. Cement for concrete is made from selected and mixed material being dried and chemically changed in high temperature treatment is slightly sloping, large kiln furnaces. The waste heat from the kilns can be used as heat source for the processing vessel for pre-drying and pre-treating material before it enters the kiln furnace, reducing the processing cost and improving quality of the cement.

The outer and inner cylindrical ring walls may have a cone or truncate cone shape top or bottom region to facilitate feed material entering into and residue leaving the vessel. Said concentric ring wall or narrow tube may be part of enclosing heating camber or furnace heating the walls. But said wails can alternatively in this invention be heated directly by applied electric heat or by other means and with usual controls and dielectric and heat insulation. For sampling feed during processing sampling tubes of usual small diameter, are provided at any height through the outer wall for taking samples of feed. Further there are provided temperature pressure and moisture sensors of feed through walls at suitable locations and connected to controller to regulate processing. In an embodiment of this invention a useful and safe chemical change and reduction of some material some very toxic, can only be bought about by substance catalysts in a pyrolitic process.

BRIEF DESCRIPTION OF THE DRAWING

The invention will be described with reference to the accompanying drawings wherein. FIG. 1 is a schematic vertical sectional. View of a thermal treatment vessel with vertical cylindrical ring shaped walls. According to one embodiment of the present invention. FIG. 2 is a cross section X—X of FIG. 1

DETAILED DESCRIPTION OF PREFERRED EMBODIMENTS

Referring to FIG. 1 and FIG. 2 there is illustrated a thermal treatment device comprising a vertical ring shaped vessel 2 with an outer cylindrical wall 4 and its lower region being truncate cone shaped and an inner concentric cylindrical wall 6, where its upper region being cone shaped and its lower region being truncate cone shaped with a fixed horizontal bottom closure plate. For heating the outer cylindrical wall 4, a concentric and enclosing square heating chamber or furnace 8 is provided comprising: vertical walls 9 a bottom plate 10 and a top plate 12 covering the furnace 8 and the ring shaped vessel 2.

The vessel 2, outer cylindrical wall 4, inner cylindrical wall 6 and top plate 12 define a ring shaped processing chamber 3. Heat insulation such as blanket with fiber glass or the like will be applied to the inside of wall 9., plate 10 and plate 12. For heating the inner cylindrical wall 6 its closed inside is shown as heating chamber or furnace 13. Heat from outside source is shown as entering the two furnaces and flue gas outlets for each furnace is shown.

An inlet 20 is provided concentrically located at the top of vessel 2 for feed entering its processing chamber 3 with appropriate devices such as screw conveyor, live bottom feeder or the like, which will prevent air entering the chamber not shown. The vertical feed filled vessel prevent air pockets. For feed like sewage sludge a little air may safely help heating during processing. But for volatile feed like rubber tire air infiltration may cause uncontrolled over heating and serious damage.

A bottom outlet 21 is provided, concentrically located and connected to lower end of the truncate cone shape wall 4, for removal of residue from chamber 3. The Lower end bottom outlet 21 is connected to screw conveyor 22 which regulate flow of residue and keep the chamber 3 and part of inlet 20 at the top filled during processing. Screw conveyor 22 is jacketed with tap water for cooling residue and is producing hot potable water during processing.

Any number of outlets from vessel are provided as needed for drying or pyrolizing of specific material. As molecules expand and break down from the heat, outlets are provided to remove the specific fluidized and gasified material. This material require many conventional devices associated the recovery such as filters, condensers, settlers, separates, boilers scrubbers, conveyors and the like.

The following outlets are shown:

Outlet for steam 25, located on top of the vessel outlet for boiling hot water 26, near top of vessel, (or alternatively for fluidized material at various height of the vessel).

Outlet for gasified material 27, at various heights of the vessel.

Although there is shown in the drawings furnace type heating the outer and inner cylindrical walls it should be understood that other type of conventional heating of said walls may be provided, such as direct electric resistance heating applied directly to said walls as part of the invention. Sampling rods 30 for samples of feed are provided at any height though outer wall of vessel. The inlet, outlets and walls of vessel are provided with temperature sensors 31, pressure sensors 32 and moisture sensors 33 of feed being processed, connected to suitable controller.

EXAMPLE 1

When municipal sewer sludge is being pyroliced, the residue at the end of the process will be charred to charcoal, fusing in any heavy metals into the tiny coal particles. Steam is being sprayed at 28 into the bottom of processing vessel 2 for further activation of the charcoal. It then moves down to the screw conveyor 22 for regulating flow and cooling the feed in cooling jacket before discharging the charcoal. The weight of charcoal is less than 10% of the weight of the entering sewage sludge feed. The removed gasified material is fuel gas, consisting mostly of clean burning carbon monoxide and hydrogen.

EXAMPLE 2

When a calciner is used for reducing chromium hexivalence, (CR+6) a toxic waste product, catalysts are pre-mixed with the feed and must be used for stabilizing and reducing molecules to harmless material during the processing. At the end of the process, steam spray at 28 is not used. However, the weight of the discharging residue is large, about the same as the entering feed, and it must be cooled, and transported.

This can be done by a heavy water spray into and mixing with residue, which cools the residue and turns it into a pumpable slurry (about 1 to 4 water). The screw conveyor is regulating flow and partly cooling the residue before the suggested slurry is formed and cooled by water spray and suction line of a pump is sucking the slurry in and forcing it out in a pipe to short or long distance discharge and drying areas. For some large existing sites, it is further suggested that the vertical ring processing vessel and the pump be mounted on a shallow draft barge. It is advantageous to move closer to the feed material and reduce the cost of material handling and operation.

DETAIL DESCRIPTION OF INVENTION

An improved thermal processing vessel, in accordance with the present invention. Molecular breakdown and beneficial reduction of organic or inorganic feed material is achieved in a pyrolytic process, with or without the use of catalysts, in the vertical cylindrical ring shaped vessel having an inside heated cylindrical ring wall in its center, forming said vessel's ring shape, and an outer heated cylindrical wall enclosing said vessel. Heating meant for heating said walls in one or divided regions when varying temperature and controls are needed to heat the feed during processing. Said processing vessel having top inlet and bottom outlet means comprising feed entrance, and residue outlet and flow control means. Said vessel, having outlet means for the generated boiling hot water, steam, and gases. Means for further treatment of residue when needed before removal from vessel. During processing said feed is entering from the top, with limited air infiltration and is, moving down through said vertical ring shaped vessel by its gravitational force increasing by the weight of material above. The increasing preasure against the walls is causing rapid boiling, gasifying and rising feed at the heating surface of the ring walls and the feed is moving down in the center of the ring.

This vigorous action is, expanding, agitating, mixing, drying and reducing the feed during said pyralytic process and help moving feed through the processing vessel. Larger wall heating surface areas (RA) per volume of said feed and a shallower feed depth (D) from wall heating surfaces, is speeding up heating of said feed material and reducing process time.

Table shows that ratio RA/D decreases parabolic with increase width of said ring. This ratio is independent from the diameter of said vertical ring shaped processing vessel. Ratio of RA/D using a one foot ring width (W) as base for the ratio is:

With (W) in feet 0.5 0.75 1.0 1.21 1.5 1.75 2.0 2.25
Ratio of RA/D 2.2 1.40 1.0 0.76 0.6 0.54 0.4 0.33

This present invention shows that to achieve rapid heat up of the feed and short process the width (W) of the ring of said ring shaped vessel shall be as small practical. The outside diameter and height of said vessel will increase the feed volume and processing capacity. Said vessel must be made of material such as stainless steel or silicone component material which function safely at the high temperatures required for said processing. A suggested feed hopper on top of said inlet could be receiving the feed and feed is kept in said hopper above a minimum level, limiting air infiltration or when needed a screw conveyor, live bottom feeder or like, is provided to prevent air infiltration into said processing vessel. For better understanding, the present invention is being depicted and described by FIG. 1 and FIG. 2 and in:

EXAMPLE 1: Processing sewage sludge in the pyrolysis process in said vessel producing: hot water, steam, gas and activated charcoal, and useful not polluting products. EXAMPLE 2: processing chromium hexivalence (CR+6) and producing harmless and environmentally exactable end products. Cr+6 molecules break up at about 1700° F., but the metal has a very strong attraction to the oxygen so it will reform when temperature drops the slightest; I am now asking for removal of the oxygen at the highest temperature as it forms and are using an organic material, a catalyst, to remove it.

Therefore, Cr+6 will be pre-mixed with up to equal volume of coal with, fkt asch or the like some moisture.

During the process H20 also breaks up helping the process, CO and H2 is formed and removed and can be used as fuel. The reduced Cr is cooled and is stable below about 500 F before it is released and harmless. In a simple bench test unit, tests were requested by me, giving very good results for this process.

EXAMPLE 3

The vertical ring processing vessel in accordance with said invention, can be used successfully for processing shredded used tires. Said vessel, including all pipes, joints, outlets and regulating locks, must have smooth surfaces to avoid wires getting caught and pile up of material. The rubber, consisting of a large number of loosely connected atoms, giving it its elastic properties, will partly break down with heat in an oxygen starved environment to liquid and gas. The processor can be tilted slightly for this type processing.

The liquid is isoprene and can be collected along the lower side and the gases on the higher side. Steel, fiber, carbon black and dirt will be discharged and must be separated by other processes. Isoprene can be returned to raw rubber with a separate catalytic process.

Many other types of material can successfully be processed for different purposes, accordance with the invention, in said vertical ring vessel with adjustment or additions made as needed to achieve the desired results for specific materials. This includes material such as municipal solid waste, office waste and industrial material and waste, toxic waste, contaminated soil, pre-treatment of material such as cement clinker, etc.

The shown examples help understand the present invention, but is not intended to limit the scope of invention.

What claimed is:

1. A processing vessel for thermally processing an feed having vertically-aligned, narrowly-spaced and heated walls for thermal treatments of conveyable feed being moved by gravity at selected process temperatures comprising: a ring-shaped cylindrical vessel having an outer ring wall between 2–3 feet larger than the diameter of an inner ring wall, the inner and outer ring walls comprising a narrow ring-shaped and tall processing chamber space; heating means for heating the inner and outer ring walls and control means for controlling the processing temperature along the height of the walls; a feed inlet at the top of the vessel and a residue outlet at the bottom of the vessel including a flow control means for keeping said vessel and a portion of said inlet means filled during processing; sampling means located at various heights of the vessel for sampling feed during processing; heat exchange means located at said residue outlet for cooling the residue and recovering heat from said residue prior to discharging the residue; at least one second outlet means located at an upper part of the vessel for removing boiling hot water and steam from the vessel; at least one third outlet means located along the height of said vessel for removing fluidized and gasified material; mean for preventing air from entering the vessel at all inlets, outlets, and the heat exchange means; wherein the heating means heats the wall surfaces thereby forcing boiling and gasified material upward along the walls while gravity simultaneously forces material along the inner portion of the ring-shaped chamber resulting in a downward spiralling and mixing movement of the feed material causing rapid heating, feed volume reduction, and steady downward gravity flow of the feed during processing.

2. A processing vessel according to claim 1 wherein said vessel comprises a tall narrow vertical tube between 12 and 18 inches wide for said thermal processing.

3. A processing vessel according to claim 1 or 2 wherein said vessel is slightly tilted and said outlet means for boiling liquid is located on a low side of the vessel and said outlet means for steam and gasified feed is located on a high side of the vessel, wherein said vessel is tilted steeply enough for steady downward gravity flow of the feed being processed.

4. A processing vessel according to claim 1 or 2 wherein the chamber between the outer and inner walls forms a circular, elliptical, rectangular, or polygonal-shaped ring.

5. A processing vessel according to claim 1 or 2 wherein the processing of the organic feed is in the form of charring the feed into charcoal at a temperature of 1650° F. and said vessel has an inlet means located at the bottom for supplying stem to the vessel, said steam being broken down to oxygen atoms and hydrogen atoms for activating the charcoal; outlet means for carbon monoxide and hydrogen fuel gases that are created and said charcoal being removed through said bottom outlet means and said heat recovery means before being discharged.

6. A processing vessel according to claim 1 or 2 wherein said vessel is used for preheating and pretreatment of clinker material and using waste heat from a cement kiln as the heating means for the vessel to preheat and pretreat the clinker feed.

7. A processing vessel according to claim 3 wherein the feed comprises shredded tires and the vessel being slightly tilted comprises outlet means on the low side of the vessel at various heights for removing an isoprene liquid with lighter liquid being removed toward outlet means located toward the upper portion of the vessel and heavier, thick liquid being removed toward the bottom of the vessel, outlet means for gasified material located on the high side of the vessel at various heights along the vessel, outlet means including a vibrating filter at a low side near the bottom of the vessel for removing fine carbon black powder.

* * * * *